Aug. 19, 1947.  W. C. BARNES ET AL  2,425,857
APPARATUS FOR DETECTING FLAWS IN RAILS
Filed Sept. 24, 1943  2 Sheets-Sheet 1

INVENTORS
Walter C. Barnes
Henry W. Keevil
BY
Marny, Brown & Cox
Att'ys

Patented Aug. 19, 1947

2,425,857

UNITED STATES PATENT OFFICE 2,425,857

APPARATUS FOR DETECTING FLAWS IN RAILS

Walter C. Barnes, Lake Bluff, and Henry W. Keevil, Evanston, Ill.

Application September 24, 1943, Serial No. 503,642

4 Claims. (Cl. 175—183)

Our invention relates to the art of magnetically detecting structural flaws in rails and has for one object the accomplishment after a test of magnetic restoration of the rails to approximate pretest state in preparation for the next test.

A second object of our invention is the avoidance of certain undesirable consequences which occasionally accompany magnetic testing. To our knowledge, these consequences have not heretofore been recognized by those skilled in the art. A further object of the invention is to preclude the same consequences arising from the installation of a new rail in a track and here again neither the effect nor the cause has been recognized.

The consequences we seek to avoid relate to the functioning of the usual railroad signal system in which the two rails of a track serve as primary conductors in the signal circuit. Such a system will respond to current failure arising either from short circuiting of the two conductors by a train or arising from opening of the circuit by a break in either of the two conductors.

It is apparent that such a signal system has two separate functions, first to carry out its normal function of properly spacing the trains by signal blocks, and, second, to indicate danger whenever a rail is completely fractured. We have discovered that occasionally the usual magnetic testing procedure may interfere with one or both of these signal functions with a consequent hazard in train operation.

A magnetic test for detecting structural flaws necessarily involves applying to the rails a flux of more or less high density and the consequent establishment of residual magnetism in the rail. Thus a longitudinally directed flux produces a corresponding longitudinal residual magnetism so that each rail length or unitary series of rail lengths becomes a permanent bar magnet. The relatively high magnetic retentivity of steel rails favors this effect.

The interference with the signal function of keeping trains safely distributed among the signal blocks arises from the fact that the rails of two adjacent blocks are normally electrically isolated by insulated joints. If either of the two rails at such a joint or gap is longitudinally magnetized, the corresponding rail end forming one face of the gap becomes a magnetic pole. Since a magnetic testing procedure to detect flaws usually involves movement across the gap in one longitudinal direction of a strong longitudinal flux, both of the two spaced rails are usually magnetized in the same longitudinal direction with the result that concentrated lines of magnetic force extend across the gap between a north pole on one side and a south pole on the other side. In a manner which will be discussed in more detail later, ferromagnetic material tends to accumulate in such a magnetized gap and to progressively form a conducting path across the gap thereby interconnecting the two signal circuits of the respective signal blocks. Such interlinking of two adjacent signal blocks may prevent independent functioning of the two signal circuits and thus cause unnecessary stop signalling.

The manner in which a magnetized rail may interfere with the second function of a signal system, namely the function of indicating danger when a rail is completely fractured, may be readily understood when it is considered that cutting a bar magnet into two longitudinal portions results in two bar magnets of like polarity. A complete fracture of a rail having high residual magnetism produces a gap in which one face is a north magnetic pole and the opposed face is a south magnetic pole. The magnetic field across the gap favors the immediate formation by rail slivers, nails, iron dust, etc., of a conducting bridge across the gap to keep current flowing in the signal circuit and to prevent the signal system from indicating the presence of the fracture.

It has been found that the material of a newly laid rail is seldom, if ever, entirely free from residual magnetism. The residual magnetism may be created incidentally in the various steps of manufacturing the rail or may be created in the course of storing, handling and transporting the rail after manufacture. If the rail is lifted only once by a powerful electromagnet it may retain such a high degree of residual magnetism as to cause the formation of conducting bridges at fractures or insulated joints as heretofore explained.

The present invention is based on our discovery of at least one of the causes of the heretofore unexplained signal failures which have at times occurred. The remedy proposed herein consists of demagnetizing the track progressively after progressively subjecting the track to magnetic flux for the purpose of detecting flaws. We propose not merely to offset the residual magnetism produced by the test procedure but also to substantially erase any previously existing residual magnetism of any polarity. In this regard, an important feature of our invention is the addition to the usual testing operation of a final demagnetizing step which combines with the earlier steps of the testing operation to provide a method for erasing pre-existing residual magnetism. It is contemplated that in the course of the testing procedure, any previously magnetized rail encountered will be restored substantially to neutral state with respect to magnetism or close enough to neutral state to avoid any possible subsequent interference with the effectiveness of the signal system.

The above and other objects of our invention will be apparent in the detailed description to follow taken with the accompanying drawings.

In the drawings, which are to be regarded as merely illustrative,

Figure 1:
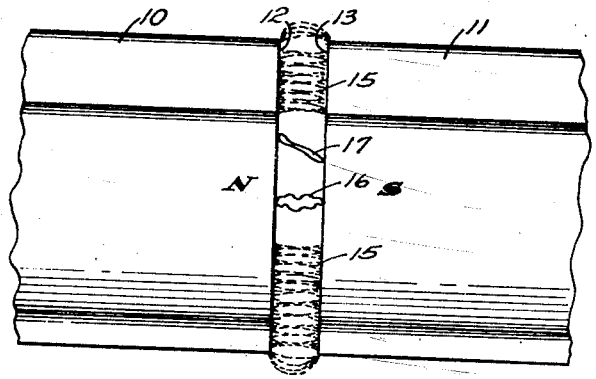
Fig. 1 is a diagrammatic view in side elevation of the two spaced ends of two adjacent rails at a rail joint.

Fig. 1 shows two spaced rails 10 and 11 at a rail joint and, for the purpose of this disclosure, the joint may be considered an insulated joint such as used to separate signal blocks. The usual joint bars and insulation are omitted for clarity. Under normal operating conditions, small bodies of ferromagnetic material may move into or near to the gap between the face 12 at the end of rail 10 and the face 13 at the end of rail 11. The small bodies of ferromagnetic material range in size from microscopic dust and minute abraded particles to relatively large bodies in the form of scales, chips, slivers and the like. It must be borne in mind that even an ordinary wind may be strong enough to carry dust particles of ferromagnetic material into the region of the gap and that the passage of a train at high speed produces such violent eddy currents of air that relatively large metal particles may be lifted and carried several feet into the region of the rail gap. Other large particles, of course, will gravitate downwardly from the passing trains or be shifted along the rails to the upper edges of the gap by the train wheels.

In the absence of a field of magnetization across the gap, the ferromagnetic particles of various size would move at random through the gap by gravity or under the force of air currents and would freely leave the gap zone. In fact, wind, and especially the violent air currents, would have the desirable effect of tending to keep the two gap faces free of clinging material and would preclude any significant cumulative depositing of the particles.

If, however, the air gap between the rails is a magnetic field, particles of ferromagetic material do not move at random through the gap and do not freely leave the gap zone. In Fig. 1, it is assumed that both rails 10 and 11 have residual magnetism to a substantial degree, the rail 10 presenting a north pole to the gap and the rail 11 presenting a south pole. It is a well-known phenomenon that small particles of ferromagnetic material continually introduced into the magnetic field at a pole face will progressively build up numerous minute stalactiform structures on the pole face oriented along the lines of force. Since the particles are supported almost entirely magnetically, they tend to form chains reaching out into space. Fig. 1 shows some of such small structures designated by the numeral 16. After a period of time depending upon the strength of the gap field and upon the prevailing operating conditions, the stalactiform structures from the opposite pole faces 12 and 13 will meet to form an electrically conducting path across the gap. As soon as the conducting bridge is established, the signal circuits of the two blocks are interlinked to cause malfunctioning of the signal system.

If a scale, chip or sliver of ferromagnetic material relatively extensive in one dimension falls into the magnetic field across the gap, the objectionable conducting path between the two signal blocks may be established instantly and long before any conducting bridge would be built by progressive accumulation of dust-sized particles. Such oversized bodies of ferromagnetic material would ordinarily move at random through the gap and would by sheer weight drop through the bottom of the gap. In the presence of the magnetic field, however, they tend to rotate in the commonly observed manner into positions of alignment across the gap. The chip 16 of ferromagnetic material in Fig. 1 is, for example, held in bridging position substantially solely by magnetic force. The sliver 17, however, has been turned by a magnetic couple to a position at which the chip tends to be mechanically supported by engaging a minutely irregular portion of one gap face and leaning against the other gap face.

If a rail is transversely fractured, a gap of the same general character will be formed, but, of course, the gap faces will be rough and irregular in profile and the gap will usually be much narrower than the gap at a juncture between two signal blocks. If the fractured rail is relatively free from residual magnetism, the physical separation of the two parts of the rail will break the signal circuit and cause the signal system to indicate danger in the well known manner. On the other hand, if the rail has a substantial degree of residual magnetism, it occasionally happens that the fractured gap is electrically bridged by magnetically suspended particles.

It is to be understood that our invention is applicable to various testing methods and apparatus. For the purpose of the present disclosure, however, we shall describe the invention as employed in a particular testing method knowing that our disclosure will be sufficient guidance for those skilled in the art who may have occasion to apply the invention to other specific testing procedures.

The particular type of flaw-detection procedure here in mind is disclosed in four Patents Nos. 2,317,718–2,317,721 issued on April 27, 1943, to Walter C. Barnes and Henry W. Keevil as joint inventors. Broadly described, the testing procedure involves applying a longitudinal flux to a rail, removing the flux to leave the rail with polarized transverse fissures and then applying magnetic-responsive means to the rail to detect the polarized flaws.

Figure 2:
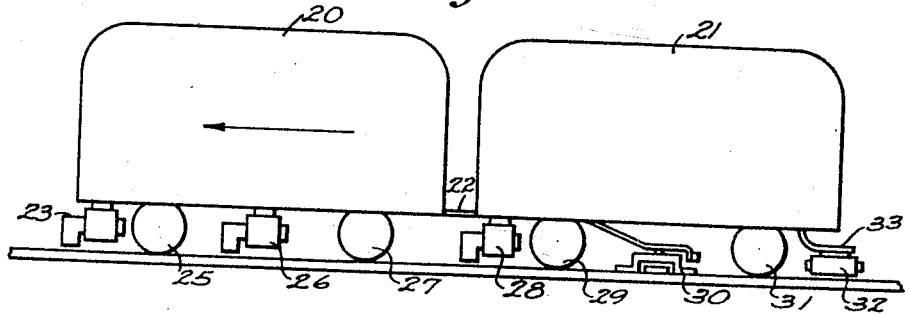
Fig. 2 is a diagrammatic view of an apparatus mounted on railway vehicles for carrying out our method.

Fig. 2 shows how apparatus incorporating the present concept may be constructed for practical rail testing. The figure shows a test car comprising a forward section 20 and a rearward section 21 preferably interconnected by nonmagnetic coupling means 22. The forward section 20 carries an L-shaped electromagnet 23 forward of front wheel 25 and carries a second L-shaped electromagnet 26 between the front wheel 25 and the rear wheel 27. The rearward section 21 carries a third L-shaped electromagnet 28 forward of its front wheel 29 and carries a flaw detecting assembly 30 between its front wheel 29 and its rear wheel 31. A demagnetizing electromagnet 32 is carried by suitable mounting means 33 on the rear end of the rearward section 21.

The three electromagnets 23, 26 and 28 are of the same polarity for a certain additive effect and each applies magnetic flux of relatively high density to the underlying rails. The third electromagnet 28 is constructed and arranged to minimize any concentration of laterally directed lines of flux leaving the rails in its magnetic circuit thereby to favor leaving the rail with a relatively high degree of residual magnetism of the same longitudinal polarity as of the applied flux. The purpose of the fourth electromagnet 32 is to substantially erase such residual magnetism after the flaw detector 30 has indicated the presence of any rail flaws.

In practicing our invention, we do not seek to change the rails magnetically to absolutely neutral state, such precision in the application of a reverse erasing flux being unnecessary. While some compensatory or restorative flux application is required, no critical relationships are involved and, in practice, one skilled in this art may readily attain the desired result from the foregoing discussion.

Figure 3:
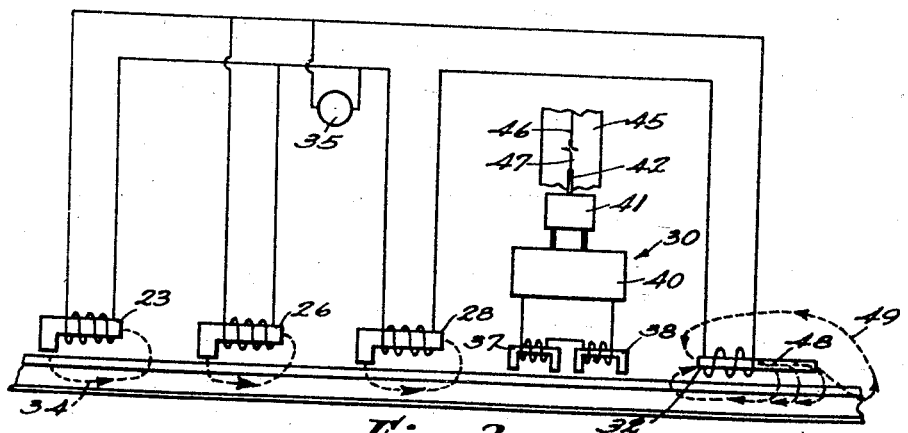
Fig. 3 is a schematic arrangement of the principal parts of our apparatus including a wiring diagram of the circuits involved.

Fig. 3 shows in a general manner the fundamental relationships in the above described apparatus. For more specific information, reference may be made to the above mentioned four patents.

The three L-shaped electromagnets 23, 26 and 28 are all wound in the same direction for magnetizing the rail 34 and are shown as connected in parallel to a suitable D. C. generator 35. Following these three electromagnets is the detector assembly 30 which, as explained in detail in the foregoing patents, may include either a single longitudinally positioned coil, or, as shown, a pair of oppositely wound longitudinally positioned induction coils 37 and 38. The two detecting coils 37 and 38 are connected with a suitable amplifier 40, the output of which energizes an electrically responsive means 41 for controlling an indicating pen 42 or a plurality of such pens. The writing point of the pen 42 rests upon a moving record tape 45 in a well known manner, flaws being indicated by small deviations 46 in the record line 47 drawn by the pen.

The electromagnet 32 for substantially erasing the residual magnetism in the rail 34 may take various forms. Preferably, the electromagnet 32 has as its core a simple straight metal bar 48 with no lateral poles whatsoever, the energizing winding being placed at one end of the bar. We have found suitable for our purpose a core two inches wide, three to six inches high, and thirty-six inches long.

As indicated in Fig. 3, the combination of a straight bar and a winding placed at one end of the bar results in longitudinal flux predominately in one direction, only a minor and insignificant amount of flux extending in the opposite direction.

It is contemplated that the flux applied to the rail 34 by the electromagnet 32 will be opposite to the polarity of the flux previously applied by the magnet 28 and will be of substantially less density to avoid creating any new residual magnetism opposite in polarity from the test-created residual magnetism. We have found that the proper relationship between the third energizing magnet 28 and the demagnetizing electromagnet may be achieved by simply winding the described bar 48 with substantially half the number of turns as the winding of the electromagnet 28 and then energizing both the electromagnets from the same source as the energizing electromagnet 28.

Since there may be variations from time to time in the total flux of the electromagnet 28 with consequent variation in the amount of residual magnetism to be erased by the following electromagnet 32, we find it desirable to interrelate the electromagnets 28 and 32 in some manner to cause the flux applied by the electromagnet 32 to vary in response to changes in the flux applied by the energizing electromagnet 28. Various well-known expedients may be employed to achieve the desired interlocking of the two electromagnets. In the preferred practice of our invention we take care not only to connect the two electromagnets 28 and 32 to the same generator 35 but also to place the two in series across the generator thereby assuring substantially synchronous variation in the two flux magnitudes.

The purpose of interlocking the electromagnet 32 with the electromagnet 28 by placing the two in the same circuit is not to make the rear electromagnet respond to what may be termed transitory variation in the field of the forward electromagnet caused by hard spots in the rail or by vertical vibration of the forward electromagnet. Rather, the purpose is to cause the strength of the rear electromagnet to follow more enduring changes in the field of the forward electromagnet, a change caused for example by passing from a string of rails of one temper or heat to a string of a different heat.

In the described apparatus, the rearmost electromagnet 32 not only substantially erases residual magnetism in the rails created by the three energizing electromagnets 23, 26 and 28 but also cooperates with the three energizing electromagnets to substantially erase any pre-existing residual magnetism regardless of polarity. Thus the three energizing electromagnets, 23, 26 and 28, being of like polarity and relatively strong, effectively erase any pre-existing residual magnetism of the opposite polarity. The only pre-existing residual magnetism that can survive the passing of the three electromagnets 23, 26 and 28 is pre-existing magnetism of the same polarity as the three electromagnets and therefore of the polarity that the following electromagnet 32 is especially designed to erase. Thus any newly laid rail having an undesirable degree of residual magnetism polarized in either longitudinal direction will be substantially demagnetized by passage of the test car over the track. It is apparent, then, that our methods and apparatus provides for simultaneously detecting flaws in a track and demagnetizing any pre-existing residual magnetism in the track.

When any electromagnet is moved along a rail to provide an erasing flux of a given polarity, some stray flux of the opposite polarity is inevitably produced simultaneously as indicated by the dotted line 49 in Fig. 3, which stray flux tends to leave the rail with final residual magnetism of said opposite polarity. A problem involved in the practice of our invention then is to so design the electromagnet 32 as to minimize the strength of the incidental rearward stray flux.

The straight-bar form of electromagnets just described is our preferred solution to this problem of reducing the undesirable stray flux to insignificant strength. Other possible solutions that may be employed in various practices of our invention are exemplified by Figs. 4, 5 and 6.

Figure 4:
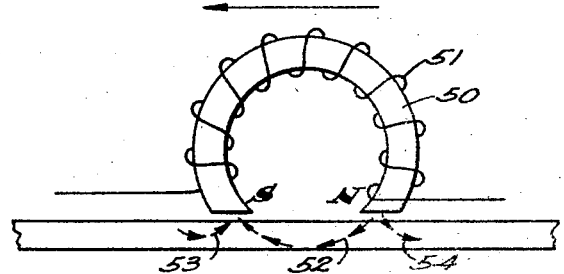
Figs. 4, 5, and 6 are diagrammatic views in side elevations of various alternative forms of electromagnets that may be employed for the final demagnetizing step.

In Fig. 4 we show an electromagnet having a U-shaped core 50 of predominantly circular configuration. The core has a winding 51 to produce north and south poles. The south pole is shown as forward with respect to the line of travel indicated by the arrow but, of course, may be rearward if the opposite demagnetizing effect is desired. The described electromagnet produces a predominantly strong forward flux 52 for demagnetizing the rail. The forward stray flux indicated at 53 is in the rearward direction but is counteracted in its effect by the immediately following main flux 52. There is a trailing rearward stray flux 54, but the described configuration of the core 50 results in this rearward stray flux 54 being so weak that it may be disregarded.

Figure 5:
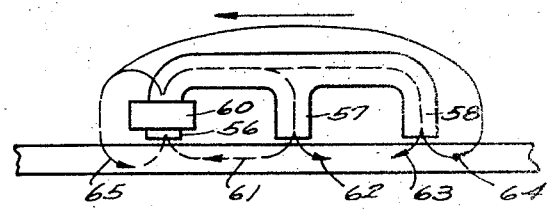

Fig. 5 shows an electromagnet with an E-shaped core having a forward pole 56, an intermediate pole 57 and a rearward pole 58, the winding 60 of the electromagnet being on the forward pole. The main demagnetizing flux of predominant strength indicated by numeral 61 passes forward through the rail from the intermediate pole 57 to the forward pole 56, returning to the rail through the intermediate pole. If only poles 56 and 57 were involved, in other words, if a simple U-shaped core were employed, the rearward and opposite stray flux 62 would be undesirably strong to leave a final residual of magnetism of undesirable strength. The presence of the third pole 58, however, causes a controlled portion of the total flux produced by the magnet coil to pass through the pole 58 and thence forward through the rail back to pole 56. This forward flux from the pole 58 indicated by the numeral 63 adequately counteracts flux 62 to prevent the creation of any substantial residual magnetism by the flux 62. Finally a rearward stray flux 64 from the pole 58 passes through the rail in an undesirable direction but because of the E-shaped configuration of the core, this trailing stray flux is such an insignificant proportion of the total flux that no desirable degree of residual magnetism is left behind.

Fig. 5 indicates that this trailing stray flux completes its circuit by passing forward to join a forward stray flux 65 through a forward portion of the rail. Any magnetizing effect of this forward flux 65 is, of course, completely erased by the predominating flux 61 that follows immediately.

Figure 6:
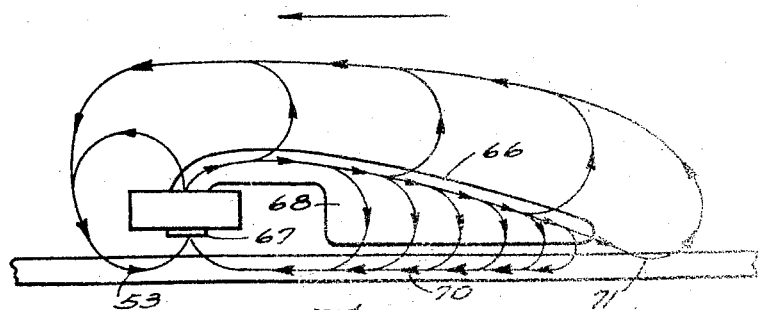

Fig. 6 shows an electromagnet with a core 66 of irregular configuration. The configuration may be described as U-shaped to provide a forward pole 67 of relatively small cross section and a rearward pole 68 of relatively large cross section, the profile of the pole 68 progressively tapering off in thickness towards the trailing side of the pole. The longitudinal extent of the trailing pole 68 with respect to the direction of travel favors the passage of numerous flux lines forward from the rearward pole to create a predominantly strong demagnetizing flux 70 extending forward to the pole 67. As a result of the described core configuration, only insignificant stray flux 71 trails behind the moving electromagnet.

The air gap longitudinally along the rearward pole 68 in Fig. 6 may be varied if desired. For example, the length of the air gap may be increased rearwardly so that the path from the rearward tip rearwardly through the rail would have the reluctance of larger air gap between the pole and the rail.

The employment of any of the above described electromagnets or magnets constructed on the same principles will restore the pre-test magnetic state of the rails sufficiently to leave the tracks prepared for the next test.

The present description of specific practices of our invention made for the purpose of disclosure and to illustrate the principles involved will suggest various substitutions and changes that may be made under our basic concepts; the right is reserved to all such departures that lie within the scope of the appended claims in view of the prior art.

We claim:

1. In an apparatus for detecting structural flaws in a rail of a railroad signal system without interfering with the function of the signal system, the combination of a first electromagnetic means movable along the rail to apply thereto a moving flux of a given polarity for subsequent detection of characteristic magnetic conditions in the vicinity of structural flaws in the rail, and a second electromagnetic means movable along the rail to apply a second moving flux to the rail, said second electromagnetic means being opposite in polarity from said first electromagnetic means and of lesser magnetic strength, said first and second electromagnetic means being electrically interconnected to cause the strength of the field of said second electromagnetic means to follow variations in the strength of the field of the first electromagnetic means whereby the variations in the counter-flux applied by the second electromagnetic means substantially follows variations in the strength of the residual magnetism created in the rail by the first electromagnetic means.

2. In an apparatus for detecting structural flaws in a rail of a railroad signal system without interfering with the function of the signal system, the combination of a first electromagnetic means of a given polarity movable along the rail to apply a first flux thereto for subsequent detection of characteristic magnetic conditions in the vicinity of structural flaws in the rail, a second electromagnetic means of opposite polarity from said first electromagnetic means, an E. M. F. source, and circuit means connecting said source with both of said electromagnetic means whereby the magnetic fields of the two electromagnetic fields vary simultaneously in response to variations of the strength of said source, said circuit means and said two electromagnetic means being so constructed and arranged that the second electromagnetic means derives less energy from said source than said first electromagnetic means.

3. In an apparatus for detecting structural flaws in a rail of a railroad signal system without interfering with the function of the signal system, the combination of a first electromagnet movable along the rail to apply a first moving flux to the rail for subsequent detection of characteristic magnetic conditions in the vicinity of rail flaws, a second electromagnet movable along the rail to apply a second flux to the rail, both of said electromagnets being connected to the same E. M. F. source, said second electromagnet being wound oppositely from the first electromagnet and having fewer turns.

4. In an apparatus for detecting structural flaws in a rail of a railroad signal system without interfering with the function of the signal system, the combination of a first electromagnetic means movable along the rail to apply thereto a moving flux of a given polarity for subsequent detection of characteristic magnetic conditions in the vicinity of structural flaws in the rail, and a second electromagnetic means movable along the rail to apply a second moving flux to the rail, said second electromagnetic means being opposite in polarity from said first electromagnetic means, said first and second electromagnetic means being electrically interconnected to cause the strength of the field of said second electromagnetic means to follow variations in the strength of the field of the first electromagnetic means whereby the variations in the counter-flux applied by the second electromagnetic means substantially follows variations in the strength of the residual magnetism created in the rail by the first electromagnetic means.

WALTER C. BARNES.
HENRY W. KEEVIL.

REFERENCES CITED

The following references are of record in the file of this patent:

UNITED STATES PATENTS

| Number | Name | Date |
|---|---|---|
| 1,628,618 | Spencer | May 10, 1927 |
| 2,207,392 | Zuschlag | July 9, 1940 |
| 2,216,600 | Moore | Oct. 1, 1940 |
| 2,317,718 | Barnes et al. | Apr. 27, 1943 |
| 2,210,770 | Muller-Ernesti | Aug. 6, 1934 |
| 2,355,940 | Zuschlag | Aug. 15, 1944 |
| 2,306,584 | Zuschlag | Dec. 29, 1942 |
| 2,363,336 | Keeler | Nov. 21, 1944 |

FOREIGN PATENTS

| Number | Country | Date |
|---|---|---|
| 419,110 | Great Britain | Nov. 6, 1934 |